United States Patent
Sakamoto et al.

(10) Patent No.: US 7,126,902 B2
(45) Date of Patent: Oct. 24, 2006

(54) OBJECTIVE LENS, OPTICAL PICKUP DEVICE AND METHOD FOR PRODUCING OPTICAL ELEMENT FOR OPTICAL PICKUP DEVICE

(75) Inventors: Katsuya Sakamoto, Hachioji (JP); Kohei Ota, Hachioji (JP); Yuichi Atarashi, Hachioji (JP)

(73) Assignee: Konica Corporation, Tokyo (JP)

( * ) Notice: Subject to any disclaimer, the term of this patent is extended or adjusted under 35 U.S.C. 154(b) by 661 days.

(21) Appl. No.: 10/223,631

(22) Filed: Aug. 20, 2002

(65) Prior Publication Data

US 2003/0112528 A1  Jun. 19, 2003

(30) Foreign Application Priority Data

Aug. 24, 2001 (JP) ............................. 2001/253798

(51) Int. Cl.
*G11B 7/00* (2006.01)
(52) U.S. Cl. ................................. 369/112.08
(58) Field of Classification Search ............ 369/112.08
See application file for complete search history.

(56) References Cited

U.S. PATENT DOCUMENTS

| 6,192,021 | B1 | 2/2001 | Saito et al. |
| 6,449,095 | B1 | 9/2002 | Ohtaki et al. |
| 6,671,247 | B1* | 12/2003 | Arai et al. ............. 369/112.01 |
| 6,834,036 | B1 | 12/2004 | Shiono et al. |
| 2001/0022690 | A1* | 9/2001 | Takeda ....................... 359/626 |

FOREIGN PATENT DOCUMENTS

| JP | 11-328264 A | 11/1999 |
| JP | 11-355788 A | 12/1999 |
| JP | 2000-047984 A | 2/2000 |
| JP | 2000-083761 A | 3/2000 |

* cited by examiner

*Primary Examiner*—Wayne Young
*Assistant Examiner*—Van T. Pham
(74) *Attorney, Agent, or Firm*—Finnegan, Henderson, Farabow, Garrett & Dunner, L.L.P.

(57) ABSTRACT

An objective lens for use in an optical pickup apparatus has a diffractive optical surface. A first light flux having a first wavelength of $\lambda 1$ is converged as a first number diffraction order diffracted-ray other than the zero-th order diffracted-ray onto an information recording plane of the first optical information recording medium having a thinner protective substrate t1 by the diffractive optical surface and a second light flux having a second wavelength of $\lambda 2$ ($\lambda 1 < \lambda 2$) is converged as a second number diffraction order diffracted-ray other than the zero-th order diffracted-ray onto the information recording plane of the second optical information recording medium having a thicker protective substrate t2 (t1<t2) by the diffractive optical surface. The second number diffraction order is different from the first number diffraction order.

10 Claims, 5 Drawing Sheets

OBJECTIVE LENS, OPTICAL PICKUP DEVICE AND METHOD FOR PRODUCING OPTICAL ELEMENT FOR OPTICAL PICKUP DEVICE

BACKGROUND OF THE INVENTION

The present invention relates to an optical pickup device and an objective lens to be used in the optical pickup, and in particular, to an objective lens of an optical pickup device capable of conducting recording and/or reproducing of information for optical information recording media each being different by using a plurality of light sources each having a different wavelength, an optical pickup device and to a method for designing an optical element for the optical pickup device.

For example, there has been developed an optical pickup device capable of recording and reproducing information for optical information recording media each being different in terms of type such as, for example, DVD and CD, and the optical pickup device is now used for various purposes. As a light source of the optical pickup device, in this case, a semiconductor laser is used in general, and appropriate wavelength λ to be used for recording or reproducing information for DVD is about 650 nm, while, appropriate wavelength λ to be used for recording or reproducing information for CD is about 780 nm.

In this case, there is a problem when recording or reproducing information by using the same optical pickup device for optical information recording media each being different in terms of type such as DVD and CD. A thickness of a transparent base board (also called a protection base board) that protects the image recording surface of a standardized DVD is 0.6 mm, and a thickness of a transparent base board that protects the image recording surface of CD is 1.2 mm. Therefore, when the information recording surface of each of DVD and CD is irradiated by a light flux emitted from the light source through the same objective lens, there is the actual state of affairs that a distance from CD to the objective lens needs to be shorter than that from DVD to the objective lens, because of the difference of the transparent base board thickness. A distance from the objective lens to the surface of the optical information recording medium, in this case, is called a working distance.

In the past, therefore, when conducting recording and/or reproducing of information for CD after conducting recording and/or reproducing of information for DVD, for example, the objective lens set to the working distance of DVD has been moved to the position that corresponds to the working distance of CD. In the case of two different working distances existing in the optical pickup device stated above, when recording or reproducing at least one of the discs, it is necessary to force to the different position in the optical axis by impressing prescribed voltage on an actuator for focusing, which causes an increase of power consumption. For this problem, there is considered an idea of the structure to move the disc portion in the optical axis direction for the objective lens. However, this idea cannot be realized actually because a driving mechanism for high speed rotation for DVD and CD needs to be moved, though it is theoretically possible.

As a method for making working distances to agree with each other, an individual subject distance is set for using, for example, DVD and CD. Namely, by making a divergent angle or a convergent angle of a light flux (including a parallel light flux) that enters an objective lens to be different between an occasion to use DVD and an occasion to use CD, it is possible to make working distances for both occasions to agree with each other approximately. However, in the optical pickup device having such structure, the distance between the objective lens to one light source needs to be different from that from the objective lens to the other light source, and the structure of the optical system becomes complicated. The problem of this kind is especially conspicuous when an optical pickup device is structured by using a light source unit that is called the so-called 2-laser 1-package wherein two light sources each having a different wavelength are formed on one base board.

SUMMARY OF THE INVENTION

The invention has been achieved in view of the problems in the conventional technology, and its object is to provide an objective lens of an optical pickup device which has a simple and compact structure and can conduct recording and/or reproducing of information for optical information recording media each being different by using plural light sources each being different in terms of wavelength, the optical pickup device, and a method of designing an optical element for the optical pickup device.

Further, another object of the invention is to provide an objective lens of an optical pickup device capable of making a difference in a working distance to be small for optical information recording media each being different in terms of a transparent base board thickness.

In addition, another object of the invention is to provide an optical pickup device capable of controlling power consumption to be small by making the difference in a working distance to be small.

The objective lens of the optical pickup device described in Item 1 is represented by an objective lens of an optical pickup device in which recording and/or reproducing of information is possible by making a light flux emitted from the first light source having a wavelength of $\lambda 1$ to be converged on an information recording surface of the first optical information recording medium through a protective base board having a thickness of t1, and recording and/or reproducing of information is possible by making a light flux emitted from the second light source having a wavelength of $\lambda 2$ ($\lambda 1 < \lambda 2$) to be converged on an information recording surface of the second optical information recording medium through a protective base board having a thickness of t2 (t1 < t2), wherein a diffractive optical surface is formed on either one of optical elements provided in an optical path, and thereby, the light flux emitted from the first light source is converged on the information recording surface of the first optical information recording medium having the thinner protective base board, as a diffracted ray of the first number diffraction order without being of the zero diffraction order, and the light flux emitted from the second light source is converged on the information recording surface of the second optical information recording medium having the thicker protective base board, as a diffracted ray of the second number diffraction order which is different from the first number diffraction order and is not the zero diffraction order, thus, the object stated above can be attained.

DETAILED DESCRIPTION OF THE PREFERRED EMBODIMENT

Figure 1:
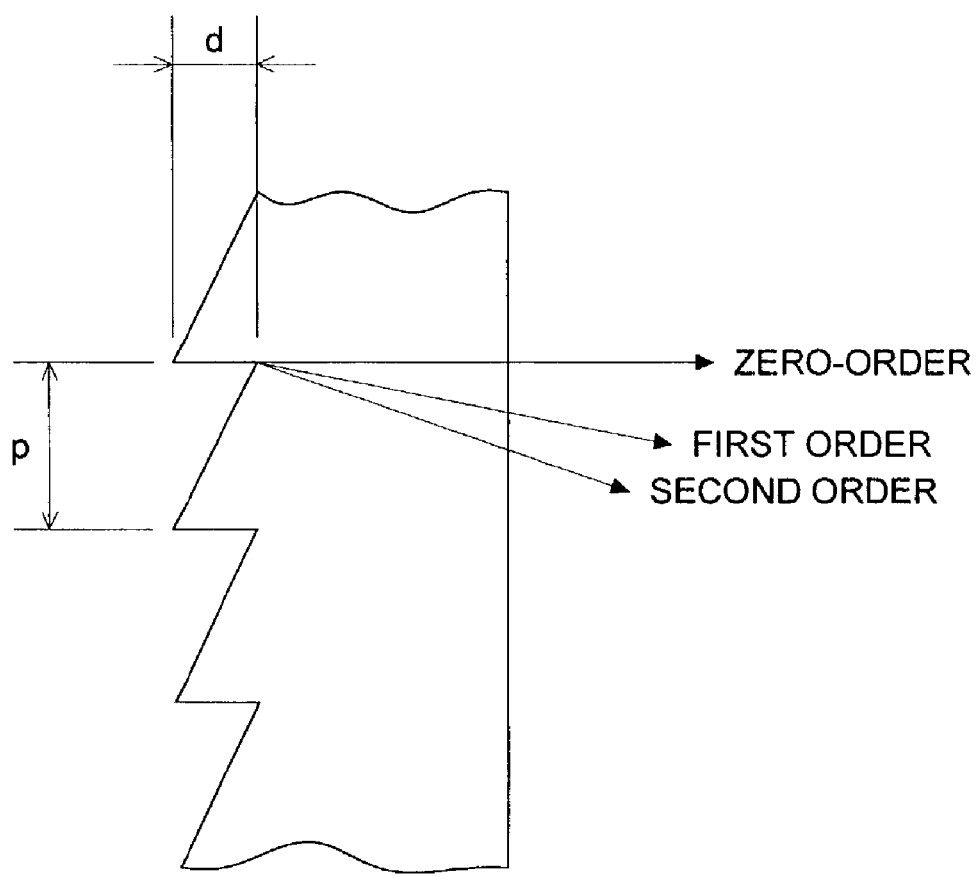
FIG. 1 is a diagram for illustrating the principle of the invention.

This invention will be explained as follows, referring to the drawing. FIG. 1 is a sectional view showing an enlarged part of the diffractive optical surface formed on a parallel flat plate representing an example of an optical element. The diffractive structure of the diffractive optical surface is a serrated ring-shaped zone wherein a width of a ring-shaped zone in the direction perpendicular to an optical axis is represented by pitch p and a depth of a groove of the ring-shaped zone is represented by d. Quantitatively, in this case, the shorter the pitch p is, the greater the power Np of the diffractive optical surface is. The power Np varies depending on the number of orders for diffraction utilizing a pitch, and it is in the tendency that the higher the number of orders for diffraction to be used is, the greater the power Np is. This relationship is expressed by $\sin\theta = m\lambda/p$, when $\theta$ represents an emergent angle of diffracted light, m represents the number of order for diffraction, $\lambda$ represents a wavelength of a parallel incident light and p represents a diffraction pitch. On the other hand, depth of a groove of the ring-shaped zone d is related to quantity of light of transmitted light flux as will be described later.

In the optical pickup device in this case, when light fluxes each having a different wavelength are arranged to enter the same objective lens under the same magnification, the structure of the optical system can be made simple. However, in the ordinary recording and/or reproducing of information employing the same order diffracted ray, there is the problem mentioned above that a working distance between an objective lens and an optical information recording medium varies depending on the type of the optical information recording medium.

In the invention, however, the problem stated above is lightened or solved by conducting recording and/or reproducing of information by the use of refracted light each being different in terms of order for refraction. To be more concrete, by setting pitch p and groove depth d of the diffractive ring-shaped zone appropriately, it is possible to make a distance (working distance) from the objective lens to the surface of the first optical information recording medium on the occasion when a light flux with wavelength $\lambda 1$ is converged, as a diffracted ray of the first number diffraction order, on an information recording surface of the first optical information recording medium and a distance (working distance) from the objective lens to the surface of the first optical information recording medium on the occasion when a light flux with wavelength $\lambda 2$ is converged, as a diffracted ray of the second number diffraction order that is lower order than the first number diffraction order, on an information recording surface of the second optical information recording medium, to be closer each other or to agree with each other.

When working distances are made to be closer each other or to agree with each other in another method, it is necessary to make the distance from the light source to the surface of the optical information recording medium to be different. If this distance is different, a sensor for recording and/or reproducing of information relating to each medium needs to be arranged at a different position corresponding to the different distance, which makes the structure of the optical pickup device to be complicated. On the contrary, in the invention, the sensor mentioned above can be arranged at the same position and the structure of the optical pickup device can be simplified, because it is also possible to make distances each being from the light source to the surface of the optical information recording medium to agree with each other.

In the objective lens of the optical pickup device described in Item 2, a light flux emitted from the first light source is converged on the first optical information recording medium having the thinner protective base board, as a diffracted ray of the first number diffraction order, while, a light flux emitted from the second light source is converged on the second optical information recording medium having the thicker protective base board, as a diffracted ray of the second number diffraction order that is lower than the first number diffraction order, thus, it is possible to exhibit the effect of the invention described in the Item 1 stated above, more effectively.

The objective lens of the optical pickup device described in Item 3 is represented by an objective lens of an optical pickup device in which recording and/or reproducing of information is possible by making a light flux emitted from the first light source having a wavelength of $\lambda 1$ to be converged on an information recording surface of the first optical information recording medium through a protective base board having a thickness of t1, and recording and/or reproducing of information is possible by making a light flux emitted from the second light source having a wavelength of $\lambda 2$ ($\lambda 1 < \lambda 2$) to be converged on an information recording surface of the second optical information recording medium through a protective base board having a thickness of t2 (t1 <t2), wherein a diffractive optical surface is formed on either one of optical elements provided in an optical path of the optical pickup device, and thereby the light flux emitted from the first light source is converged on the optical information recording medium, as a diffracted ray of the first order, and the light flux emitted from the second light source is converged on the optical information recording medium, as a diffracted ray of the second order which is lower than the first order, and further, the standard position of the objective lens conducting reproducing of information for the first optical information recording medium having a thinner protective base board and the standard position of the objective lens conducting reproducing of information for the second optical information recording medium having a thicker protective base board are almost the same, thus, it is possible to exhibit more effectively the action and effect of the invention described in the Item 1 mentioned above. Incidentally, the "standard position" means the position of the objective lens in the direction of the optical axis in the case of considering no focusing operations, and it is the same as a design position in terms of meaning.

The objective lens of the optical pickup device described in Item 4 is represented by an objective lens of an optical pickup device in which recording and/or reproducing of information is possible by making a light flux emitted from the first light source having a wavelength of $\lambda 1$ to be converged on an information recording surface of the first optical information recording medium through a protective base board having a thickness of t1, and recording and/or reproducing of information is possible by making a light flux emitted from the second light source having a wavelength of $\lambda 2$ ($\lambda 1 < \lambda 2$) to be converged on an information recording surface of the second optical information recording medium through a protective base board having a thickness of t2 (t1 <t2), wherein a distance from the first light source to the surface of the protective base board of the first optical information recording medium and a distance from the second light source to the surface of the protective base board of the second optical information recording medium are almost the same, and a diffractive optical surface is formed on either one of optical elements provided in the optical path, and a light flux from the first light source is converged, as a diffracted ray with the first number diffraction order, on the information recording surface of the first optical information recording medium, while, a light flux from the second light source is converged, as a diffracted ray with the second number diffraction order that is lower than the first number diffraction order, on the information recording surface of the second optical information recording medium, thus, it is possible to exhibit more effectively the effect of the invention described in the Item 1 mentioned above.

The objective lens of the optical pickup device described in Item 5 is represented by an objective lens of an optical pickup device in which recording and/or reproducing of information is possible by making a light flux emitted from the first light source having a wavelength of $\lambda 1$ to be converged on an information recording surface of the first optical information recording medium through a protective base board having a thickness of t1, and recording and/or reproducing of information is possible by making a light flux emitted from the second light source having a wavelength of $\lambda 2$ ($\lambda 1 < \lambda 2$) to be converged on an information recording surface of the second optical information recording medium through a protective base board having a thickness of t2 (t1 <t2), wherein light fluxes from the first light source and from the second light source are both a finite light flux or an infinite light flux and enter the objective lens, a diffractive optical surface is provided on either one of optical elements provided in the optical path, the light flux from the first light source is converged by the diffractive optical surface on the optical information recording medium as a diffracted ray of the first number diffraction order, while, the light flux from the second light source is converged on the optical information recording medium as a diffracted ray of the second number diffraction order that is lower than the first number diffraction order, thus, the effect of the invention described in the Item 1 can be exhibited more effectively. In addition, the structure of the light converging optical system can further be simplified, because the light flux from the first light source and the light flux from the second light source enter the objective lens as infinite light or finite light.

In the objective lens of the optical pickup device described in Item 6, the diffractive optical surface has a diffracting characteristic to make the focal length relating to a light flux with a longer wavelength $\lambda 2$ to be greater than the focal length relating to a light flux with a shorter wavelength $\lambda 1$. It is therefore possible to attain the effect to make the working distance to be closer each other or to agree with each other.

To be more concrete in explanation, under the condition that DVD represents the first optical information recording medium and CD represents the second optical information recording medium, when D1 represents a distance from the objective lens to the DVD surface in the case of conducting recording and/or reproducing of information for DVD by using the second order diffracted ray of a light flux having a wavelength of $\lambda 1=650$ nm, and D2 represents a distance from the objective lens to the CD surface in the case of conducting recording and/or reproducing of information for CD by using the first order diffracted ray of a light flux having a wavelength of $\lambda 2=780$ nm, D3 representing a distance from the objective lens to the CD surface in the case of converging properly the second order diffracted ray (same diffraction order as for DVD) of a light flux having a wavelength of $\lambda 2=780$ nm for CD, satisfies the expressions of D3<D2 and D3<D1. Namely, when comparing with the conventional system wherein the diffracted ray of the same diffraction order has been used for the occasion of using DVD and the occasion of using CD, it is possible to establish a difference between distances (working distances) each being from the objective lens to the optical information recording medium to be small, and even possible to make both distances to agree with each other in certain circumstances. Incidentally, if the expression D1≈D2 holds, even in the case to conduct recording and/or reproducing of information alternately for DVD and CD, it is not necessary to move the objective lens in the direction of the optical axis (excluding fine movement for focusing), and the structure of the optical pickup device can be simplified.

In the objective lens of the optical pickup device described in Item 7, because of a light source unit wherein the first light source and the second light source are arranged on the same base board, the structure can further be simplified, compared with an occasion to provide these light sources separately.

The optical pickup device described in Item 8 is represented by an optical pickup device in which a first light source with a wavelength of $\lambda 1$, a second light source with a wavelength of $\lambda 2$ ($\lambda 1 < \lambda 2$) and a light converging optical system are provided, and when a light flux from the first light source is converged by the light converging optical system on the information recording surface of the first optical information recording medium through a protective base board having a thickness of t1, recording and/or reproducing of information is possible, and when a light flux from the second light source is converged by the light converging optical system on the information recording surface of the second optical information recording medium through a protective base board having a thickness of t2 (t1 <t2), recording and/or reproducing of information is possible, wherein, a diffractive optical surface is formed on either one of optical elements provided in the optical path, and a light flux from the first light source is converged on the information recording surface of the first optical information recording medium having a thinner protective base board as a diffracted ray of the first number diffraction order without being of the zero diffraction order, while, a light flux from the second light source is converged on the information recording surface of the second optical information recording medium having a thicker protective base board as a diffracted ray of the second number diffraction order that is different from the first number diffraction order and without being of the zero diffraction order. The optical pickup device of the invention exhibits action and effect which are the same as those of the invention described in Item 1.

In the optical pickup device described in Item 9, a light flux from the first light source is converged on the fist optical information recording medium having a thinner protective base board as a diffracted ray of the first number diffraction order, and a light flux from the second light source is converged on the second optical information recording medium having a thicker protective base board as a diffracted ray of the second number diffraction order that is lower than the first number diffraction order. The optical pickup device of the invention exhibits action and effect which are the same as those of the invention described in Item 2.

The optical pickup device described in Item 10 is represented by an optical pickup device in which a first light source with a wavelength of λ1, a second light source with a wavelength of λ2 (λ1<λ2) and a light converging optical system are provided, and when a light flux from the first light source is converged by the light converging optical system on the information recording surface of the first optical information recording medium through a protective base board having a thickness of t1, recording and/or reproducing of information is possible, and when a light flux from the second light source is converged by the light converging optical system on the information recording surface of the second optical information recording medium through a protective base board having a thickness of t2 (t1 <t2), recording and/or reproducing of information is possible, wherein, a diffractive optical surface is formed on either one of optical elements provided in the optical path of the optical pickup device, and a light flux from the first light source is converged on the optical information recording medium as a diffracted ray of the first number diffraction order while, a light flux from the second light source is converged on the optical information recording medium as a diffracted ray of the second number diffraction order that is lower than the first number diffraction order, and the standard position of the objective lens that conducts reproducing of information for the first optical information recording medium having a thinner protective base board is mostly the same as the standard position of the objective lens that conducts reproducing of information for the second optical information recording medium having a thicker protective base board. The optical pickup device of the invention exhibits action and effect which are the same as those of the invention described in Item 3.

The optical pickup device described in Item 11 is represented by an optical pickup device in which a first light source with a wavelength of λ1, a second light source with a wavelength of λ2 (λ1<λ2) and a light converging optical system are provided, and when a light flux from the first light source is converged by the light converging optical system on the information recording surface of the first optical information recording medium through a protective base board having a thickness of t1, recording and/or reproducing of information is possible, and when a light flux from the second light source is converged by the light converging optical system on the information recording surface of the second optical information recording medium through a protective base board having a thickness of t2 (t1 <t2), recording and/or reproducing of information is possible, wherein, a distance from the first light source to the surface of the protective base board of the first optical information recording medium is mostly the same as a distance from the second light source to the surface of the protective base board of the second optical information recording medium, a diffractive optical surface is provided on either one of optical elements provided in the optical path, and a light flux from the first light source is converged by the diffractive optical surface on the information recording surface of the first optical information recording medium as a diffracted ray of the first number diffraction order, while, a light flux from the second light source is converged by the diffractive optical surface on the information recording surface of the second optical information recording medium as a diffracted ray of the second number diffraction order that is lower than the first number diffraction order. The optical pickup device of the invention exhibits action and effect which are the same as those of the invention described in Item 4.

The optical pickup device described in Item 12 is represented by an optical pickup device in which a first light source with a wavelength of λ1, a second light source with a wavelength of λ2 (λ1<λ2) and a light converging optical system are provided, and when a light flux from the first light source is converged by the light converging optical system on the information recording surface of the first optical information recording medium through a protective base board having a thickness of t1, recording and/or reproducing of information is possible, and when a light flux from the second light source is converged by the light converging optical system on the information recording surface of the second optical information recording medium through a protective base board having a thickness of t2 (t1 <t2), recording and/or reproducing of information is possible, wherein, light fluxes from the first light source and from the second light source are both a finite light flux or an infinite light flux and enter the objective lens, a diffractive optical surface is provided on either one of optical elements provided in the optical path, the light flux from the first light source is converged by the diffractive optical surface on the optical information recording medium as a diffracted ray of the first number diffraction order, while, the light flux from the second light source is converged on the optical information recording medium as a diffracted ray of the second number diffraction order that is lower than the first number diffraction order, thus, the effect of the invention described in the Item 1 can be exhibited more effectively. In addition, the structure of the light converging optical system can further be simplified, because the light flux from the first light source and the light flux from the second light source enter the objective lens as infinite light or finite light. The optical pickup device of the invention exhibits action and effect which are the same as those of the invention described in Item 5.

In the optical pickup device described in Item 13, the diffractive optical surface has a diffracting characteristic to make the focal length relating to a light flux with a longer wavelength λ2 to be greater than the focal length relating to a light flux with a shorter wavelength λ1. The optical pickup device of the invention exhibits action and effect which are the same as those of the invention described in Item 6.

In the optical pickup device described in Item 14, the first light source and the second light source are arranged on the same base board. The optical pickup device of the invention exhibits action and effect which are the same as those of the invention described in Item 7.

In the method for designing an optical element for the optical pickup device described in Item 15, for a light flux from the first light source with a wavelength of λ1 and for a light flux from the second light source with a wavelength of λ2 (λ1<λ2), a diffraction pitch of the diffractive structure and a diffraction order are established for determining an emergent angle of the light flux passing through the optical element, and a depth of a diffractive groove of the diffractive structure is established for determining quantity of light of the light flux passing through the optical element, when establishing an emergent angle and quantity of light of each light flux which has passed the optical element. Therefore, it is possible to obtain the optical pickup device wherein a difference of the working distance between the occasion of using DVD and the occasion of using CD is controlled to be small, while sufficient quantity of light on the image recording surface is secured.

In the method for designing an optical element for the optical pickup device described in Item 16, a light flux from the first light source is converged, by the diffractive structure, on the information recording surface of the first optical information recording medium having a thinner protective base board as a diffracted ray of the first number diffraction order without being of the zero diffraction order, and a light flux from the second light source is converged, by the diffractive structure, on the information recording surface of the second optical information recording medium having a thicker protective base board as a diffracted ray of the second number diffraction order that is different from the first number diffraction order and is not the zero diffraction order. Therefore, as explained with respect to Item 1, it is possible to obtain the optical pickup device wherein a difference of the working distance between the occasion of using DVD and the occasion of using CD is controlled to be small.

The method for designing an optical element for the optical pickup device described in Item 17 is represented by a method for designing an optical element for the optical pickup device in which, when a light flux from the first light source with a wavelength of $\lambda 1$ is converged on the information recording surface of the first optical information recording medium through a protective base board having a thickness of t1, recording and/or reproducing of information is possible, and when a light flux from the second light source having a wavelength of $\lambda 2$ ($\lambda 1 < \lambda 2$) is converged on the information recording surface of the second optical information recording medium through a protective base board having a thickness of t2 (t1<t2), recording and/or reproducing of information is possible, wherein, for a light flux from the first light source with a wavelength of $\lambda 1$ and for a light flux from the second light source with a wavelength of $\lambda 2$ ($\lambda 1 < \lambda 2$), a diffraction pitch of the diffractive structure and a diffraction order are established for determining an emergent angle of the light flux passing through the optical element, and a depth of a diffractive groove of the diffractive structure is established for determining quantity of light of the light flux passing through the optical element, when establishing an emergent angle and quantity of light of each light flux which has passed the optical element, and therefore, it is possible to obtain the optical pickup device wherein a difference of the working distance between the occasion of using DVD and the occasion of using CD is controlled to be small, while sufficient quantity of light on the image recording surface is secured.

In the method for designing an optical element for the optical pickup device described in Item 18, a light flux from the first light source is converged, by the diffractive structure, on the information recording surface of the first optical information recording medium having a thinner protective base board as a diffracted ray of the first number diffraction order without being of the zero diffraction order, and a light flux from the second light source is converged, by the diffractive structure, on the information recording surface of the second optical information recording medium having a thicker protective base board as a diffracted ray of the second number diffraction order that is different from the first number diffraction order and is not the zero diffraction order. Therefore, as explained with respect to Item 1, it is possible to obtain the optical pickup device wherein a difference of the working distance between the occasion of using DVD and the occasion of using CD is controlled to be small.

The "diffractive optical surface" mentioned in the present specification means an optical surface on which a "diffractive structure" or a "diffractive ring-shaped zone" is formed, and the "diffractive structure" or the "diffractive ring-shaped zone" means a portion wherein a relief is provided on the surface of an optical element such as, for example, an objective lens so that the optical element may have a function to converge or diverge a light flux by diffraction. As a form of the relief, there is known a ring-shaped zone which is almost in a shape of a concentric circle whose center falls on an optical axis, and looks like a saw tooth when its section is viewed on a plane including the optical axis, and such form is especially called "diffractive ring-shaped zone".

In the present specification, an objective lens in a narrow sense is a lens having a light-converging function which is arranged to face an optical information recording medium at the position closest to the optical information recording medium, under the condition that the optical information recording medium is loaded in the optical pickup device, and an objective lens in a broad sense is a lens that can be operated by an actuator in at least a direction of an optical axis together with the lens in a narrow sense.

In the present specification, the second optical information recording medium means optical discs of various CD types such as, for example, CD-R, CD-RW, CD-Video and CD-ROM, and the first optical information recording medium means optical discs of various DVD types such as DVD-ROM and DVD-Video used for reproducing only and DVD-RAM, DVD-R and DVD-RW used for both reproducing and recording. Further, t representing a thickness of a transparent base board in the present specification also includes t=0.

EMBODIMENT OF THE INVENTION

Figure 2:
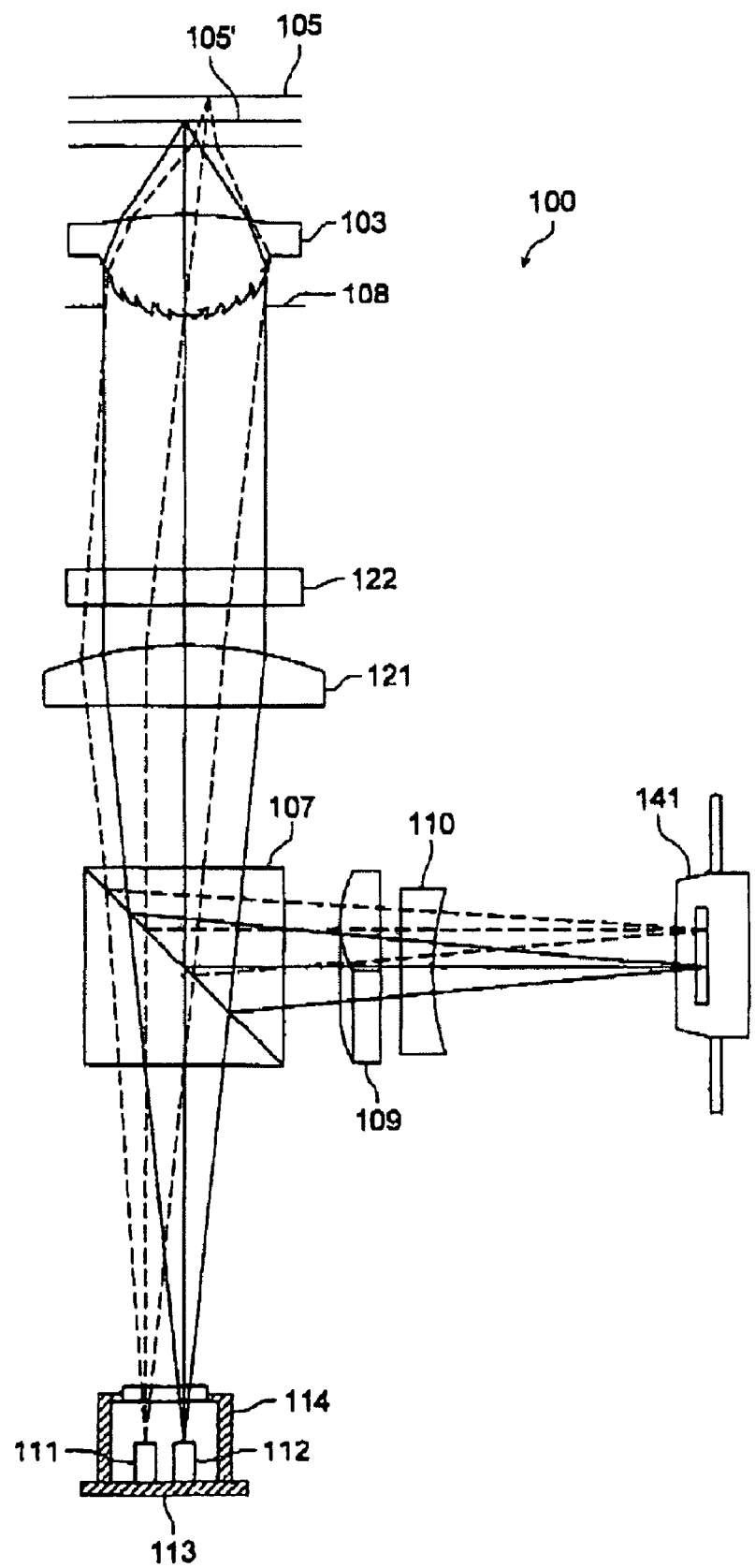
FIG. 2 is a schematic structural diagram of an optical pickup device relating to the first embodiment.

An embodiment of the invention will be explained as follows, referring to the drawings. FIG. 2 is a schematic structural diagram of optical pickup device 100 relating to the embodiment of the invention. In FIG. 2, optical pickup device 100 is provided with optical unit 114 wherein the first light source 111 for conducting recording and/or reproducing for the first optical information recording medium (for example, DVD) and the second light source 112 having a wavelength different from that of the first light source for conducting recording and/or reproducing for the second optical information recording medium (for example, CD) are arranged on the same base board 113, collimator lens 121 for converting a divergent angle of a divergent light flux emitted from each of the light sources 111 and 112 into a desired divergent angle, ¼ wavelength plate 122, objective lens 103 that converges a light flux passing through the collimator lens 121 and the ¼ wavelength plate 122 on each of information recording surfaces 105 and 105' of optical information recording media, and optical detector 141 that receives reflected light from the optical information recording medium. In the drawing, the numeral 108 represents a diaphragm, 107 represents a beam splitter that deflects the reflected light from the information recording surface to the optical detector 141, the numeral 109 represents a cylindrical lens, and 110 represent a concave lens.

In the present embodiment, a parallel light flux is made to enter the objective lens 103 representing an optical element under the same magnification, both in the case of using DVD and of using CD. As will be stated later, a diffractive ring-shaped zone is formed on the objective lens 203.

Figure 3:
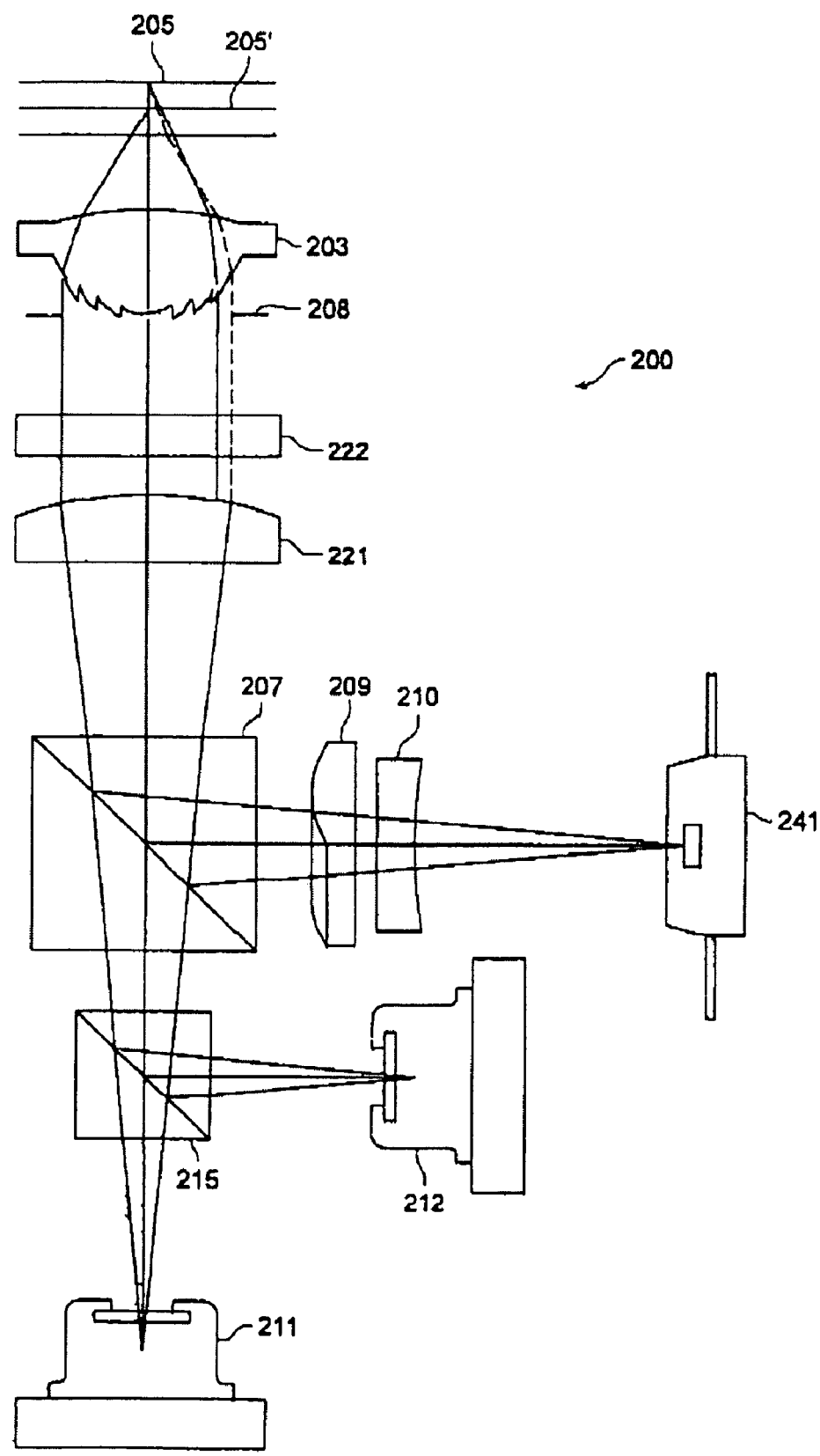
FIG. 3 is a schematic structural diagram of an optical pickup device relating to the second embodiment.

FIG. 3 is a schematic structural diagram of optical pickup device 200 relating to the second embodiment. In FIG. 3, optical pickup device 200 is provided with first light source 211 for conducting recording and/or reproducing for the first optical information recording medium (for example, DVD), second light source 212 with a wavelength different from that of the first light source 211 for conducting recording and/or reproducing for the second optical information recording medium (for example, CD), beam splitter 215 that makes paths of light fluxes from light sources 211 and 212 to agree with each other, collimator lens 221 for converting a divergent angle of a divergent light flux emitted from each of the light sources 211 and 212 into a desired divergent angle, ¼ wavelength plate 222, objective lens 203 that converges a light flux passing through the collimator lens 221 and the ¼ wavelength plate 222 on each of information recording surfaces 205 and 205' of optical information recording media, and optical detector 241 that receives reflected light from the optical information recording medium. In the drawing, the numeral 208 represents a diaphragm, 207 represents a beam splitter that deflects the reflected light from the information recording surface to the optical detector 241, the numeral 209 represents a cylindrical lens, and 210 represent a concave lens.

In the present embodiment, a parallel light flux is made to enter the objective lens 203 representing an optical element under the same magnification, both in the case of using DVD and of using CD. As will be stated later, a diffractive ring-shaped zone is formed on the objective lens 203.

Figure 4:
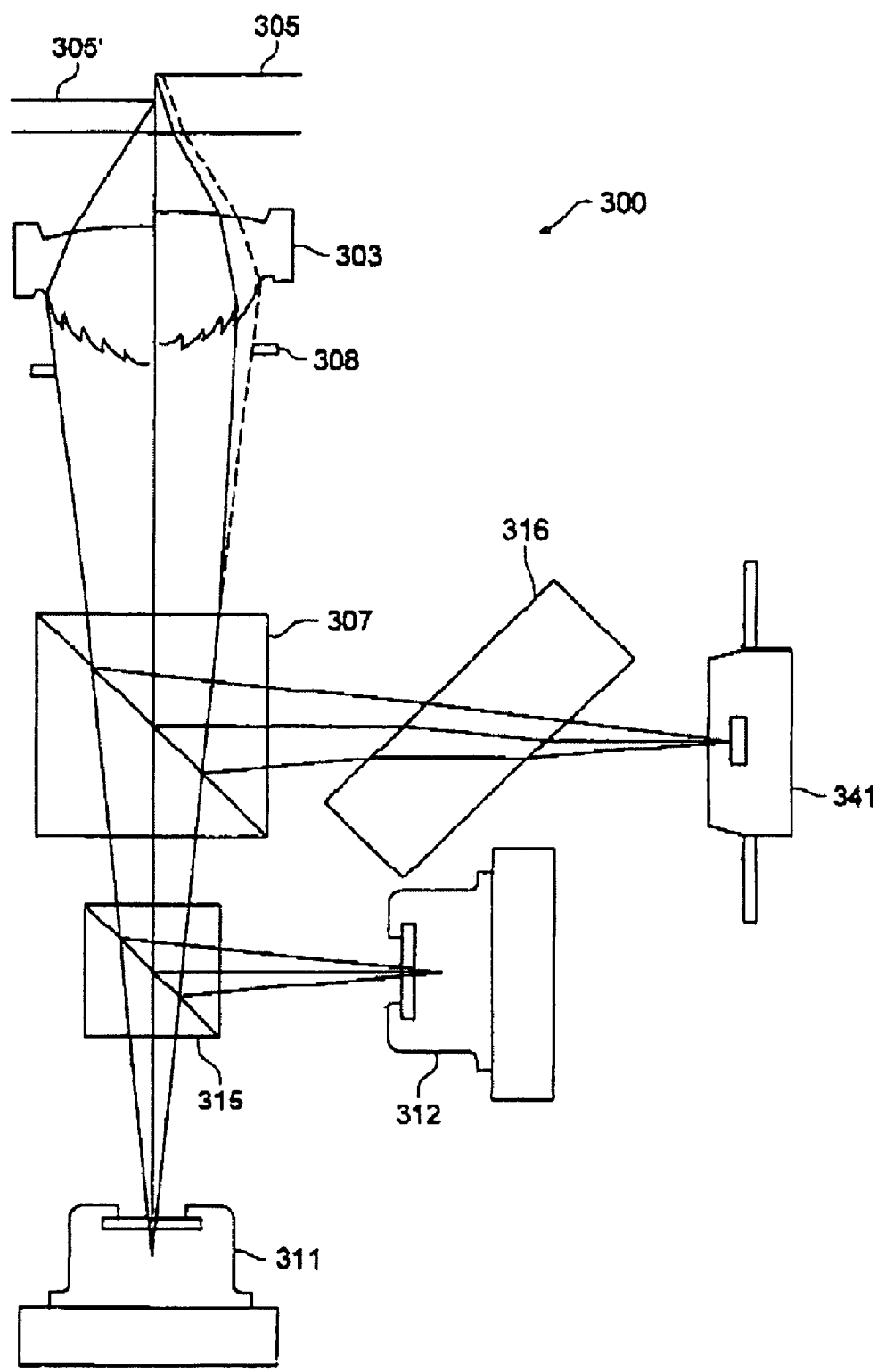
FIG. 4 is a schematic structural diagram of an optical pickup device relating to the third embodiment.

FIG. 4 is a schematic structural diagram of optical pickup device 300 relating to the third embodiment. In FIG. 4, optical pickup device 300 is provided with first light source 311 for conducting recording and/or reproducing for the first optical information recording medium (for example, DVD), second light source 312 with a wavelength different from that of the first light source 311 for conducting recording and/or reproducing for the second optical information recording medium (for example, CD), beam splitter 315 that makes paths of light fluxes from light sources 311 and 312 to agree with each other, objective lens 303 that makes divergent light fluxes emitted respectively from the light sources 311 and 312 to be converged respectively on information recording surfaces 305 and 305', and optical detector 341 that receives reflected light from the optical information recording medium. In the drawing, the numeral 308 represents a diaphragm, 307 represents a beam splitter that deflects the reflected light from the information recording surface to the optical detector 341 and 316 represent an astigmatism generating plate.

In the present embodiment, an arrangement is made so that a divergent light flux is made to enter the objective lens 303 representing an optical element under the same magnification, even in the case of using DVD and CD. As will be described later, a diffractive ring-shaped zone is formed on the objective lens 303.

EXAMPLE 1

Example 1 explained below is one relating to the objective lens that can be applied to the third Embodiment mentioned above. Table 1 shows lens data of the objective lens in Example 1. In the present example, a second order diffracted ray is used as the first number diffraction order diffracted ray for recording or reproducing information of DVD, and a first order diffracted ray is used as the second number diffraction order diffracted ray for recording or reproducing information of CD. Incidentally, hereafter (including lens data in the table), an exponent of 10 (for example, $2.5 \times 10^{-3}$) is expressed by the use of E (for example, 2.5×E-3)

TABLE 1

$f_1$ = 2.33 mm $f_2$ = 2.71 mm

| the $i^{th}$ surface | ri | di (655 nm) | ni (655 nm) | di (785 nm) | ni (785 nm) | |
|---|---|---|---|---|---|---|
| 0 |  | ∞ |  | ∞ |  |  |
| 1 | ∞ | 0.0 | 1.0 | 0.0 | 1.0 | Diaphragm diameter φ2.796 mm |
| 2 | 2.01959 | 1.2 | 1.54094 | 1.2 | 1.53716 |  |
| 2' | 1.42597 | 1.224061 | 1.54094 | 1.224061 | 1.53716 |  |
| 3 | −25.9900 | 1.196 | 1.0 | 1.196 | 1.0 |  |
| 4 | ∞ | 0.6 | 1.57752 | 1.2 | 1.57063 |  |
| 5 | ∞ |  |  |  |  |  |

Aspheric surface data
Second surface (0 < h < 1.170 mm: DVD/CD shared area)
Aspheric surface coefficient

| κ | −1.5687 × E−0 |  |  |
|---|---|---|---|
| A1 | +2.9580 × E−2 | P1 | 4.0 |
| A2 | +3.4603 × E−3 | P2 | 6.0 |
| A3 | −2.4657 × E−3 | P3 | 8.0 |
| A4 | −3.3232 × E−5 | P4 | 10.0 |

Optical path difference function (Coefficient of optical path difference function: Standard wavelength DVD: 510 nm, CD: 1020 nm Design number of diffraction order DVD: Second order, CD: First order)
C2 −5.6204×E+1
C4 +3.0941×E−1
C6 +4.9114×E−1
C8 −1.4886×E−0
C10 +4.0173×E−1

Second' (2' nd) surface (1.170 mm < h: DVD exclusive area)
Aspheric surface coefficient

| κ | −1.5771 × E−0 |  |  |
|---|---|---|---|
| A1 | +2.9580 × E−2 | P1 | 4.0 |
| A2 | +3.4603 × E−3 | P2 | 6.0 |
| A3 | −2.4657 × E−3 | P3 | 8.0 |
| A4 | −3.3232 × E−5 | P4 | 10.0 |

Optical path difference function (Coefficient of optical path difference function: Standard wavelength 655 nm Design number of diffraction order: First order)
C2 −6.4666×E+1
C4 −3.7183×E+1
C6 −3.9693×E−0
C8 +2.4809×E−0
C10 +1.0239×E−0

Third surface Aspheric surface coefficient

| κ | −6.9965 × E+1 |  |  |
|---|---|---|---|
| A1 | +3.5539 × E−2 | P1 | 4.0 |
| A2 | −2.6354 × E−3 | P2 | 6.0 |
| A3 | −2.1939 × E−2 | P3 | 8.0 |
| A4 | +1.4438 × E−2 | P4 | 10.0 |

-continued

| Third surface Aspheric surface coefficient | | | |
|---|---|---|---|
| A5 | −4.8315 × E−3 | P5 | 12.0 |
| A6 | +7.5577 × E−4 | P6 | 14.0 |

The objective lens in the present example is composed of a plastic lens having an aspheric surface on its both sides, and each aspheric surface has a shape of the aspheric surface expressed by Numeral 1.

$$Z = \frac{rh^2}{1 + \sqrt{1-(1+\kappa)r^2h^2}} + \sum_{n=1} A_n h^{Pn} \quad \text{(Numeral 1)}$$

In the expression above, Z represents an axis in the direction of an optical axis, h represents an axis in the direction perpendicular to the optical axis, r represents a paraxial radius of curvature, κ represents the constant of the cone and A represents the aspheric surface coefficient.

With regard to the diffractive structure in general, the optical path difference function Φ is expressed by Numeral 2 with a unit of mm.

$$\Phi = \lambda \sum_{i=1}^{\infty} b_{2i} h^{2i} = m \times \lambda \sum_{i=1}^{\infty} C_{2i} h^{2i} \quad \text{(Numeral 2)}$$

In the expression above, m represents a diffraction order. By making the coefficient of the second degree to be a nonzero value, it is possible to give paraxial power to the lens at the diffraction section.

Numeral 3 is a conditional expression to create a shape of diffraction. In the expression, $\lambda_{BDVD}$ represents a wavelength of a light source in using DVD and $m_{DVD}$ represents a diffraction order in using DVD, while, $\lambda_{BCD}$ represents a wavelength of a light source in using CD and $m_{CD}$ represents a diffraction order in using CD. Further, $C_{2DVD}$ represents the coefficient of the second degree of the optical path difference function of DVD, and $C_{2CD}$ represents the coefficient of the second degree of the optical path difference function of CD.

$$\lambda_{BDVD} \times m_{DVD} = \lambda_{BCD} \times m_{CD} \quad \text{(Numeral 3)}$$

$$\frac{\lambda_{BDVD}}{C_{2DVD}} = \frac{\lambda_{BCD}}{C_{2CD}} \quad \text{(Numeral 4)}$$

In this case, Numeral 5 expresses refracting power Ψ of the objective lens, in which, ΨB represents refracting power on the base surface (refracting interface), and ΨD represents refracting power by a diffractive ring-shaped zone.

$$\phi = \phi_B + \phi_D \quad \text{(Numeral 5)}$$

Therefore, a difference between working distances in the present example is within a range shown by Numeral 6. $\Psi_{DVD}$ represents refracting power of the objective lens in using DVD, and $\Psi_{CD}$ represents refracting power of the objective lens in using CD. Further, Δt represents a difference (0.6 mm) of a transparent base board between DVD and CD, and n represents a refractive index of the objective lens. A distance from the third surface of the objective lens to the surface of the disc is the same (1.196 mm) for both DVD and CD, which is clear from the Table 1.

$$0.05 \times \frac{\Delta t}{n} \leq \left| \frac{1}{\varphi_{DVD}} - \frac{1}{\varphi_{CD}} \right| \leq \frac{\Delta t}{n} \quad \text{(Numeral 6)}$$

EXAMPLE 2

Example 2 explained below is one relating to the objective lens that can be applied to the third Embodiment mentioned above. Table 2 shows lens data of the objective lens in Example 2. In the present example, a second order diffracted ray is used as the first number diffraction order diffracted ray for recording or reproducing information of DVD, and a first order diffracted ray is used as the second number diffraction order diffracted ray for recording or reproducing information of CD. In the Table 2, a distance from the third surface of the objective lens to the surface of the disc for DVD is closer to that for CD, compared with an occasion where the diffracted ray of the same diffraction order is used.

TABLE 2

$f_1 = 2.33$ mm $f_2 = 2.61$ mm

| The i<sup>th</sup> surface | ri | di (655 nm) | ni (655 nm) | di (785 nm) | ni (785 nm) | |
|---|---|---|---|---|---|---|
| 0 | ∞ | | | | | |
| 1 | ∞ | 0.0 | 1.0 | 0.0 | 1.0 | Diaphragm diameter φ2.796 mm |
| 2 | 1.85897 | 1.2 | 1.54094 | 1.2 | 1.53716 | |
| 2' | 1.47619 | 1.21316 | 1.54094 | 1.21316 | 1.53716 | |
| 3 | −14.0775 | 1.218 | 1.0 | 1.118 | 1.0 | |
| 4 | ∞ | 0.6 | 1.57752 | 1.2 | 1.57063 | |
| 5 | ∞ | | | | | |

Aspheric surface data
Second surface (0 < h < 1.170 mm: DVD/CD shared area)
Aspheric surface coefficient

| κ | −1.5156 × E−0 | | |
|---|---|---|---|
| A1 | +2.8854 × E−2 | P1 | 4.0 |
| A2 | +2.0447 × E−3 | P2 | 6.0 |
| A3 | −6.0325 × E−4 | P3 | 8.0 |
| A4 | −2.4061 × E−4 | P4 | 10.0 |

Optical path difference function (Coefficient of optical path difference function: Standard wavelength DVD: 510 nm, CD: 1020 nm Design number of diffraction order DVD: Second order, CD: First order)

C2 −4.2680×E+1

C4 +2.3808×E−1

C6 +3.7853×E−2

C8 −4.9602×E−1

C10 +1.4294×E−1

| Second' (2' nd) surface (1.170 mm < h: DVD exclusive area) Aspheric surface coefficient | | | |
|---|---|---|---|
| κ | −1.3032 × E−0 | | |
| A1 | −6.3184 × E−3 | P1 | 4.0 |
| A2 | −1.9690 × E−2 | P2 | 6.0 |
| A3 | +1.2941 × E−2 | P3 | 8.0 |
| A4 | −1.1260 × E−3 | P4 | 10.0 |

Optical path difference function (Coefficient of optical path difference function: Standard wavelength 655 nm Design number of diffraction order: First order)

C2 −4.5786×E+1
C4 −3.2395×E+1
C6 −2.3649×E−0
C8 +2.7165×E−0
C10 +5.7145×E−1

| Third surface Aspheric surface coefficient | | | |
|---|---|---|---|
| κ | +1.1000 × E+1 | | |
| A1 | +2.6682 × E−2 | P1 | 4.0 |
| A2 | +2.2041 × E−4 | P2 | 6.0 |
| A3 | −1.8484 × E−2 | P3 | 8.0 |
| A4 | +1.4895 × E−2 | P4 | 10.0 |
| A5 | −6.0856 × E−3 | P5 | 12.0 |
| A6 | +1.0311 × E−3 | P6 | 14.0 |

EXAMPLE 3

Example 3 explained below is one relating to the objective lens that can be applied to the third Embodiment mentioned above. Table 3 shows lens data of the objective lens in Example 1. In the present example, a third order diffracted ray is used as the first number diffraction order diffracted ray for recording or reproducing information of DVD, and a second order diffracted ray is used as the second number diffraction order diffracted ray for recording or reproducing information of CD. A distance from the third surface of the objective lens to the surface of the disc is the same (1.033 mm) for both DVD and CD, which is clear from the Table 3.

TABLE 3

$f_1 = 2.33$ mm $f_2 = 2.75$ mm

| The i$^{th}$ surface | ri | di (655 nm) | ni (655 nm) | di (785 nm) | ni (785 nm) | |
|---|---|---|---|---|---|---|
| 0 | ∞ | | | ∞ | | |
| 1 | ∞ | 0.0 | 1.0 | 0.0 | 1.0 | Diaphragm diameter φ2.796 mm |
| 2 | 2.56053 | 1.2 | 1.54094 | 1.2 | 1.53716 | |
| 2' | 1.59176 | 1.22903 | 1.54094 | 1.22903 | 1.53716 | |
| 3 | 4.3089 | 1.033 | 1.0 | 1.033 | 1.0 | |
| 4 | ∞ | 0.6 | 1.57752 | 1.2 | 1.57063 | |
| 5 | ∞ | | | | | |

| Aspheric surface data Second surface (0 < h < 1.170 mm: DVD/CD shared area) Aspheric surface coefficient | | | |
|---|---|---|---|
| κ | −1.7668 × E−0 | | |
| A1 | +2.2032 × E−2 | P1 | 4.0 |
| A2 | −2.4628 × E−3 | P2 | 6.0 |
| A3 | −1.2864 × E−3 | P3 | 8.0 |
| A4 | +3.7427 × E−4 | P4 | 10.0 |

Optical path difference function (Coefficient of optical path difference function: Standard wavelength DVD: 600 nm, CD: 900 nm Design number of diffraction order DVD: Third order, CD: Second order)

C2 −7.4825×E+1
C4 −7.4768×E−1
C6 −1.1376×E−0
C8 −1.5174×E−1
C10 +1.1882×E−1

| Second' (2' nd) surface (1.170 mm < h: DVD exclusive area) Aspheric surface coefficient | | | |
|---|---|---|---|
| κ | −2.1052 × E−0 | | |
| A1 | −2.3598 × E−2 | P1 | 4.0 |
| A2 | −2.5178 × E−2 | P2 | 6.0 |
| A3 | +1.2733 × E−2 | P3 | 8.0 |
| A4 | +6.0486 × E−4 | P4 | 10.0 |

Optical path difference function (Coefficient of optical path difference function: Standard wavelength 655 nm Design number of diffraction order: First order)

C2 −1.6921×E+2
C4 −5.4858×E+1
C6 −1.7188×E−0
C8 +4.8122×E−0
C10 +4.0747×E−1

| Third surface Aspheric surface coefficient | | | |
|---|---|---|---|
| κ | +1.6027 × E−0 | | |
| A1 | +1.4967 × E−2 | P1 | 4.0 |
| A2 | −2.0256 × E−2 | P2 | 6.0 |
| A3 | −1.2076 × E−2 | P3 | 8.0 |
| A4 | +1.6057 × E−2 | P4 | 10.0 |
| A5 | −1.8525 × E−3 | P5 | 12.0 |
| A6 | −3.9764 × E−3 | P6 | 14.0 |

Figure 5:
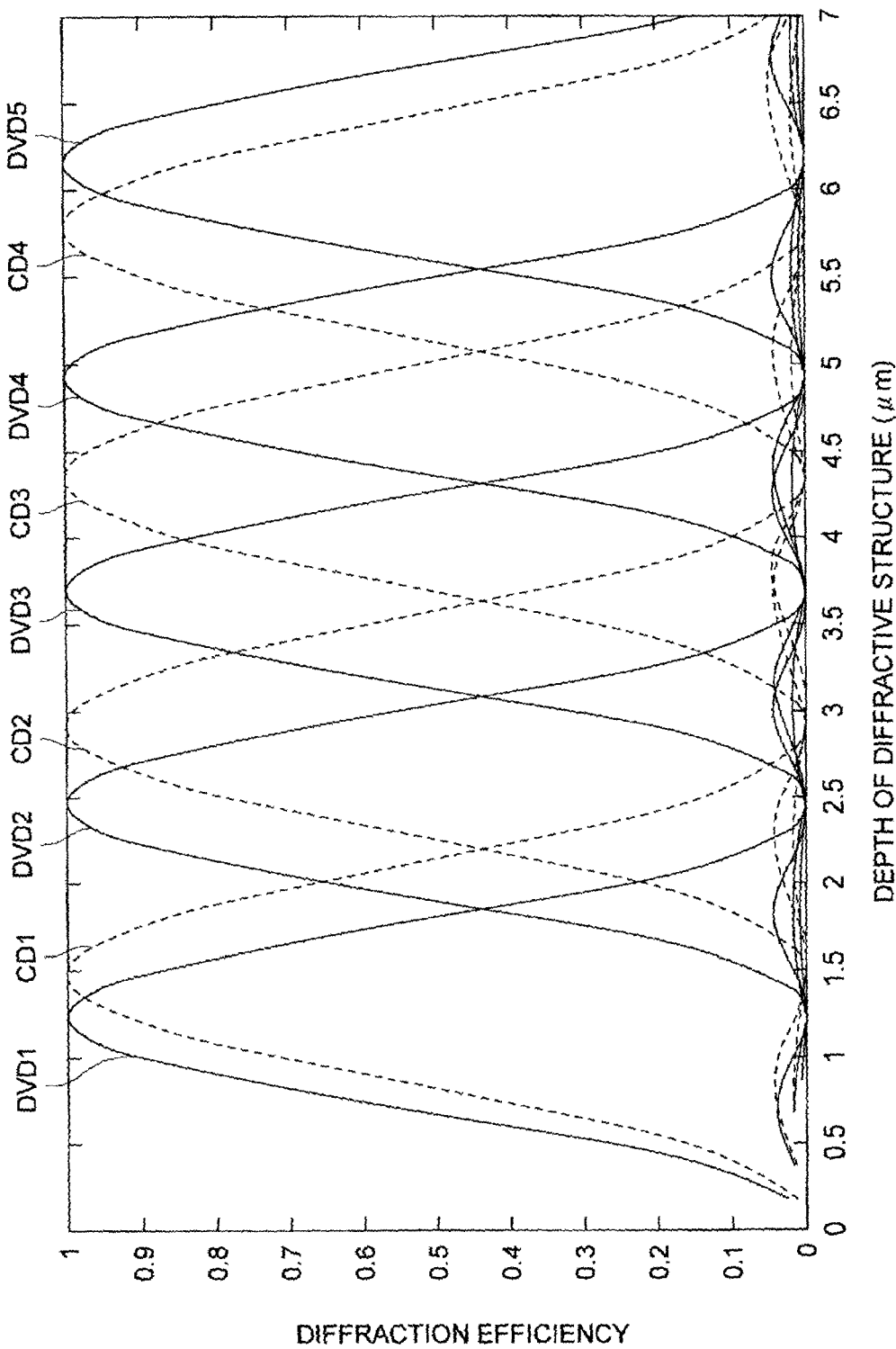
FIG. 5 is a diagram showing an example of relationship between diffraction groove depth d and diffraction efficiency (quantity of light of diffracted ray).

FIG. 5 is a diagram showing an example of relationship between diffraction groove depth d and diffraction efficiency (quantity of light of diffracted ray). Therefore, it is possible to establish appropriately a quantity of diffracted ray by setting a value of the diffraction order and a value of a diffraction groove depth properly for DVD and CD.

In the embodiment stated above, there has been shown an arrangement wherein a working distance in the case of using CD mainly has been long. Owing to this, it is possible to obtain a desired value for the working distance in the case of using CD, even when a focal length for DVD is made to be short. Since a light flux diameter of the objective lens is proportional to a focal length and to numerical aperture NA, if the focal length is made to be shorter, an outside diameter of the objective lens can be made smaller accordingly, and an optical pickup device can be made smaller, which is an advantage.

EFFECT OF THE INVENTION

The invention makes it possible to provide an optical pickup device which is simple and compact in terms of structure, and uses plural light sources each having a different wavelength to conduct recording and/or reproducing information for optical information recording media each being different, and exhibits various effects, an objective lens and a method of manufacturing an optical element.

What is claimed is:

1. An objective lens for use in an optical pickup apparatus which conducts recording and/or reproducing information for a first optical information recording medium by converging a first light flux having a first wavelength of $\lambda 1$ from a first light source through a protective substrate having a thickness of t1 onto an information recording plane of the first optical information recording medium and conducts recording and/or reproducing information for a second optical information recording medium by converging a second light flux having a second wavelength of $\lambda 2$ ($\lambda 1 < \lambda 2$) from a second light source through a protective substrate having a thickness of t2 (t1 < t2) onto an information recording plane of the second optical information recording medium, comprising:

an optical element provided in an optical path; and
a diffractive optical surface formed on at least one surface of the optical element;
wherein the first light flux is converged as a first number diffraction order diffracted-ray other than the zero-th order diffracted-ray onto the information recording plane of the first optical information recording medium having the protective substrate by the diffractive optical surface and the second light flux is converged as a second number diffraction order diffracted-ray other than the zero-th order diffracted-ray onto the information recording plane of the second optical information recording medium having the protective substrate by the diffractive optical surface;
wherein the second number diffraction order is lower than the first number diffraction order; and
wherein the diffractive optical surface has a diffractive characteristic to make a second focal length with regard to the second light flux to be larger than a first focal length with regard to the first light flux.

2. The objective lens of claim 1, wherein the objective lens conducts recording and/or reproducing information for the first optical information recording medium when located at a first standard position and conducts recording and/or reproducing information for the second optical information recording medium when located at a second standard position, and wherein the first standard position and the second standard position are almost the same position.

3. The objective lens of claim 1, wherein
a surface of the protective substrate of the first information recording medium is distant from the first light source with a first distance and a surface of the protective substrate of the second information recording medium is distant from the second light source with a second distance, and wherein the first distance and the second distance are almost the same distance.

4. The objective lens of claim 1, wherein the first light flux emitted from the first light source and the second light flux emitted from the second light source are incident on the objective lens as a finite light flux or an infinite light flux.

5. The objective lens of claim 1, wherein the first light source and the second light source are structured in a light source unit mounted on a single base board.

6. An optical pickup apparatus, comprising:
a first light source to emit a first light flux having a first wavelength of $\lambda 1$;
a second light source to emit a second light flux having a second wavelength of $\lambda 2$ ($\lambda 1 < \lambda 2$);
a light converging system including an objective lens, to converge the first light flux through a protective substrate having a thickness of t1 onto an information recording plane of a first optical information recording medium so as to conduct recording and/or reproducing information for the first optical information recording medium, and to converge the second light flux through a protective substrate having a thickness of t2 (t1 < t2) onto an information recording plane of a second optical information recording medium so as to conduct recording and/or reproducing information for the second optical information recording medium;
the objective lens comprising:
an optical element provided in an optical path; and
a diffractive optical surface formed on at least one surface of the optical element;
wherein the first tight flux is converged as a first number diffraction order diffracted-ray other than the zero-th order diffracted-ray onto the information recording plane of the first optical information recording medium having the protective substrate by the diffractive optical surface and the second light flux is converged as a second number diffraction order diffracted-ray other than the zero-th order diffracted-ray onto the information recording plane of the second optical information recording medium having the protective substrate by the diffractive optical surface;
wherein the second number diffraction order is a lower number diffraction order than the first number diffraction order; and
wherein the diffractive optical surface has a diffractive characteristic to make a second focal length with regard to the second light flux to be larger than a first focal length with regard to the first light flux.

7. The optical pickup apparatus of claim 6, wherein the objective lens conducts recording and/or reproducing information for the first optical information recording medium when located at a first standard position and conducts recording and/or reproducing information for the second optical information recording medium when located at a second standard position, and wherein the first standard position and the second standard position are almost the same position.

8. The optical pickup apparatus of claim 6, wherein a surface of the protective substrate of the first information recording medium is distant from the first light source with a first distance and a surface of the protective substrate of the second information recording medium is distant from the second light source with a second distance, and wherein the first distance and the second distance are almost the same distance.

9. The optical pickup apparatus of claim 6, wherein the first light flux emitted from the first light source and the second light flux omitted from the second light source are incident on the objective lens as a finite light flux or an infinite light flux.

10. The optical pickup apparatus of claim 6, wherein the first light source and the second light source are structured in a light source unit mounted on a single base board.

* * * * *